(12) United States Patent
Cheung

(10) Patent No.: US 10,210,616 B2
(45) Date of Patent: Feb. 19, 2019

(54) KERNAL APPROXIMATION ON FRACTIONAL DIFFERENTIAL OPERATOR FOR EDGE DETECTION

(71) Applicant: Hong Kong Applied Science and Technology Research Institute Co., Ltd., Shatin, New Territories (HK)

(72) Inventor: Ka Chun Cheung, Chai Wan (HK)

(73) Assignee: HONG KONG APPLIED SCIENCE AND TECHNOLOGY RESEARCH INSTITUTE CO., LTD., Shatin (HK)

( * ) Notice: Subject to any disclaimer, the term of this patent is extended or adjusted under 35 U.S.C. 154(b) by 83 days.

(21) Appl. No.: 15/499,374

(22) Filed: Apr. 27, 2017

(65) Prior Publication Data
US 2018/0315198 A1    Nov. 1, 2018

(51) Int. Cl.
| | | |
|---|---|---|
| G06K 9/00 | (2006.01) |
| G06K 9/48 | (2006.01) |
| G06K 9/40 | (2006.01) |
| G06T 7/13 | (2017.01) |
| G06T 7/168 | (2017.01) |

(52) U.S. Cl.
CPC ............... G06T 7/13 (2017.01); G06T 7/168 (2017.01)

(58) Field of Classification Search
USPC .......................................... 382/199, 154, 266
See application file for complete search history.

(56) References Cited

U.S. PATENT DOCUMENTS

| | | | |
|---|---|---|---|
| 7,388,679 B2 | 6/2008 | Yoshino et al. |
| 9,354,046 B2 | 5/2016 | Tohara |

FOREIGN PATENT DOCUMENTS

| | | | |
|---|---|---|---|
| CN | 101930600 A | 12/2010 |
| CN | 103065297 A | 4/2013 |
| CN | 101841642 B | 7/2013 |
| CN | 103247047 A | 8/2013 |
| CN | 104200432 A | 12/2014 |
| EP | 1944730 A2 | 7/2008 |

OTHER PUBLICATIONS

Larnier et al, "fractional-order diffusion for image reconstruction", 2012IEEEm pp. 1057-1060.*

(Continued)

*Primary Examiner* — Kathleen Y Dulaney
(74) *Attorney, Agent, or Firm* — Brinks Gilson & Lione

(57) ABSTRACT

Methods are described for detecting an edge of an object within an image with a fractional differential operator. Methods are also described for calculating 3D information using a strip pattern and the disclosed edge detection method. The fractional differential operator may be a modified Riesz space fractional differential operator. When calculating the fractional derivative of the image, a kernel approximation, in which a scaled Gaussian kernel function or a simplified scaled Gaussian kernel function, is applied to discretize the modified Riesz space fractional differential operator locally. The disclosed method improves the accuracy of edge detection, eliminates the need of applying additional fractional integration for noise suppression, and requires a smaller mask length to achieve desired accuracy.

25 Claims, 17 Drawing Sheets
(5 of 17 Drawing Sheet(s) Filed in Color)

(56) References Cited

OTHER PUBLICATIONS

Zhang et al, "Nonlocal Fractional-Order Diffustion for Denoising in Speckle INterferometry Fringes", 2016 OPtical SOciety of America, pp. 1-2.*
Mathieu et al "Fractional differentiation for edge detection", 2003 Signal Processing 83, pp. 2421-2432.*
Hacini et al "A 2D-fractional Derivative Mask for Image Feature Edge Detection", May 2017, IEEE, pp. 1-6.*
International Search Report corresponding to PCT Application No. PCT/CN2017/082937, dated Jan. 25, 2018, (11p).
Pan, Xiang et al., "*Novel Fractional-order Calculus Masks and Compound Derivatives with Applications to Edge Detection*," 6th International Congress on Image and Signal Processing, (CISP 2013), 978-1-4799-2764-7/13 2013 IEEE, pp. 309-314.
Tian, Dan et al., "*A Fractional-order Edge Detection Operator for Medical Image Structure Feature Extraction*," 26th Chinese Control and Decision Conference (CCDC 2014), 978-1-4799-3708-0/14 2014 IEEE, pp. 5173-5176.
Ye, Yongqiang et al., "*Fractional 90-Degree Phase-Shift Filtering Based on Liouville-Weyl Differintegral*," Department of Automatic Engineering, Nanjing University of Aeronautics and Astronautics, 29 Yudao Street, Nanjing 210016, China, 978-1-4799-1501-9/13, 2013 IEEE, pp. 69-72.

* cited by examiner $$\begin{bmatrix} 1 & 0 \\ 0 & -1 \end{bmatrix}$$

Figure 7A (Prior Art)

$$\frac{1}{3}\begin{bmatrix} -1 & 0 & 1 \\ -1 & 0 & 1 \\ -1 & 0 & 1 \end{bmatrix}$$

Figure 7B (Prior Art)

$$\frac{1}{4}\begin{bmatrix} -1 & 0 & 1 \\ -2 & 0 & 2 \\ -1 & 0 & 1 \end{bmatrix}$$

Figure 7C (Prior Art)

$$\begin{bmatrix} 0 \\ 0.0003 \\ 0.0034 \\ 0.0246 \\ 0.1082 \\ 0.2784 \\ 0.3884 \\ 0.1967 \\ -0.1967 \\ -0.3884 \\ -0.2784 \\ -0.1082 \\ -0.0246 \\ -0.0034 \\ -0.0003 \\ 0 \end{bmatrix}$$

Figure 7D (Prior Art)

$$\begin{bmatrix} -1.4597 \\ -1.1330 \\ -1.0385 \\ -0.9242 \\ -0.7597 \\ -0.5424 \\ -0.2829 \\ 0 \\ 0.2829 \\ 0.5424 \\ 0.7597 \\ 0.9242 \\ 1.0385 \\ 1.1330 \\ 1.4597 \end{bmatrix}$$

Figure 7E

KERNAL APPROXIMATION ON FRACTIONAL DIFFERENTIAL OPERATOR FOR EDGE DETECTION

A method for detecting an edge of an object within an image with utilizing a fractional differential operator is described.

Edge detection is known as an important tool in image processing, machine vision and computer vision such as image segmentation, feature extraction, etc. An image can be viewed as a collections of pixels having an intensity as a function of two arguments: x-axis position value and y-axis position value. The edge appears at the location where rapid change of the intensity function occurs. Therefore, detecting a first-order or second-order derivative of the intensity function is useful to locate such positions with rapid change, thus permitting detection of the location of the edge. Besides the first-order or second-order derivative, a fractional-order differential operator is also considered. Previously, detecting edges with several kinds of fractional derivative were developed, yielding unsatisfactory edge detection results.

BRIEF DESCRIPTION OF THE DRAWINGS

The system and method described below may be better understood with reference to the following drawings and description of non-limiting and non-exhaustive embodiments. The components in the drawings are not necessarily to scale. Emphasis instead is placed upon illustrating the principles of the disclosure. The patent or application file contains at least one drawing executed as a photograph and in color. Copies of this patent or patent application with photographs and color drawings will be provided by the Office upon request and payment of the necessary fee.

FIG. 7A shows the Roberts operator.

FIG. 7B shows the Prewitt operator.

FIG. 7C shows the Sobel operator.

FIG. 7D shows the Canny operator with the mask length of 16.

FIG. 7E shows the fractional operator in the present disclosure with mask length of 15, the fractional order of 0.5, and the shape parameter of 0.5.

DETAILED DESCRIPTION

Figure 1:
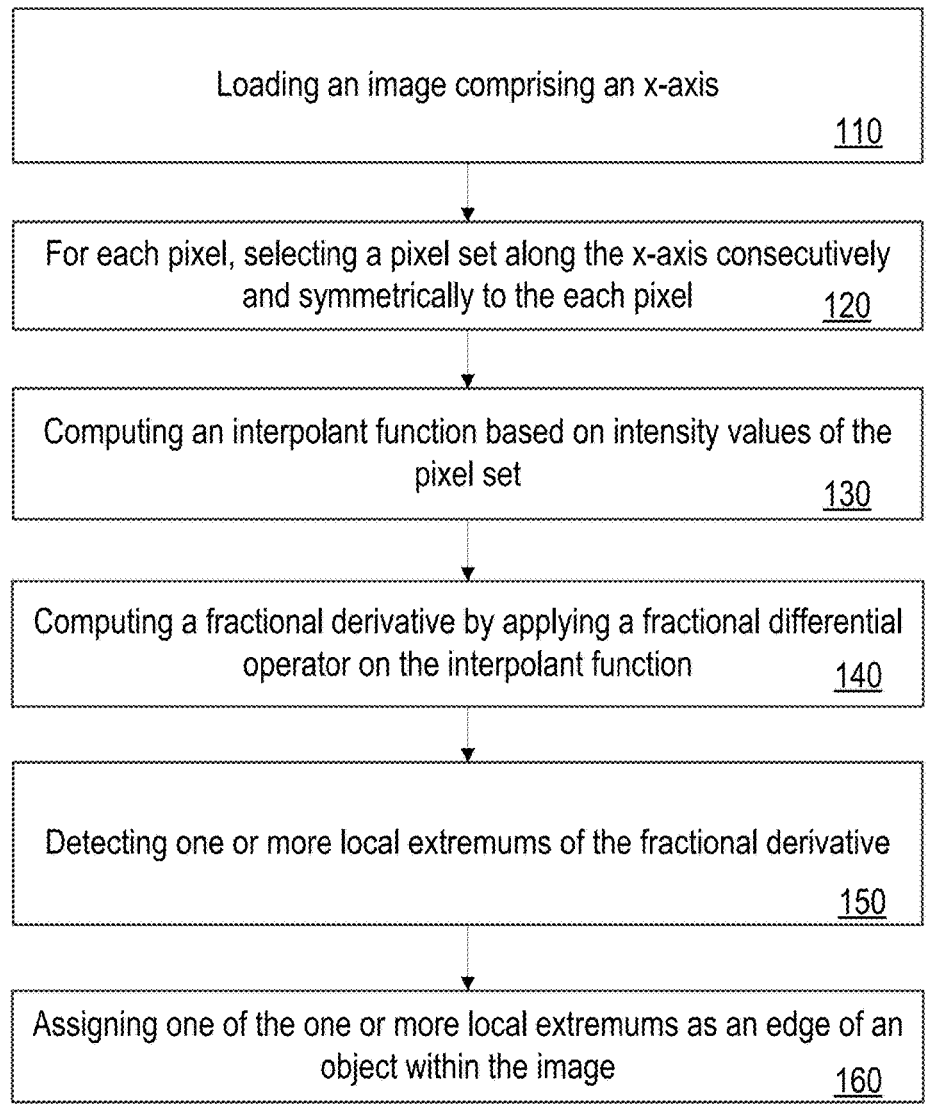
FIG. 1 shows a block diagram of a method of detecting an edge of an object within an image.

The present disclosure describes a method for detecting an edge of an object within an image with a fractional differential operator. Rather than using conventional fractional differential operators, a modified Riesz space fractional differential operator is used to detect the edge of the object within the image. When calculating the fractional derivative by applying the modified Riesz space fractional differential operator on the image, a kernel approximation, by a scaled Gaussian kernel function, is applied to discretize the modified Riesz space fractional differential operator locally. The disclosed method improves the accuracy of edge detection, eliminates the need to apply additional fractional integration for noise suppression, and requires a smaller mask length to achieve desired accuracy. The disclosed edge detection method may be used in 3D scanning technology using a strip pattern.

In a first aspect of the method of performing edge detection within an image, the method includes loading an image comprising an x-axis, and for each pixel of the image, selecting a pixel set along the x-axis consecutively and, if desired, symmetrically to each pixel. The method includes computing an interpolant function of each pixel of the image based on the intensity values of the pixel set, and computing a fractional derivative of each pixel of the image by applying a modified Riesz space fractional differential operator on the interpolant function. Furthermore, the method includes detecting one or more local extremums of the fractional derivative, and assigning one of the local extremums as an edge of an object within the image.

In a second aspect of the method of performing edge detection within an image, the method includes loading an image comprising an x-axis, and for each pixel of the image, selecting a pixel set along the x-axis consecutively and, if desired, symmetrically to each pixel. The method includes computing an interpolant function of each pixel of the image based on the intensity values of the pixel set. The method also includes approximating the fractional derivative by a scaled Gaussian kernel function, and computing a fractional derivative of each pixel of the image by applying a fractional differential operator on the interpolant function. Furthermore, the method includes detecting one or more local extremums of the fractional derivative, and assigning one of the local extremums as an edge of an object within the image.

Furthermore, in another aspect a method of calculating 3D information includes projecting a strip pattern on a 3D object, and acquiring an image with the strip pattern projected on the 3D object. The method also includes detecting edges of the strip pattern within the image based on the edge detection method disclosed in the first and second aspects. Furthermore the method includes calculating 3D information of the 3D object.

The method will now be described more fully hereinafter with reference to the accompanying drawings, which form a part hereof, and which show, by way of illustration, specific example embodiments. The method may, however, be embodied in a variety of different forms and, therefore, covered or claimed subject matter is intended to be construed as not being limited to any exemplary embodiments set forth. The method may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

FIG. 1 shows a method of detecting an edge of an object within an image. The method includes loading an image comprising an x-axis 110. For each pixel, the method includes selecting a pixel set along the x-axis consecutively and, if desired, symmetrically to each pixel 120, and computing an interpolant function based on intensity values of the pixel set 130. The method further includes computing a fractional derivative by applying a modified Riesz space fractional differential operator on the interpolant function 140, detecting one or more local extremums of the fractional derivative 150, and assigning one of the one or more local extremums as the edge of the object within the image 160.

The method may be implemented on a device. The device includes a memory storing instructions and a processor in communication with the memory. When the processor executes the instructions, the processor may be configured to cause the device to perform the method. The device may be an electronic device, including, but not limited to a personal computer, a workstation, a handheld device, and any other electronic device with computing capability.

When the device loads the image comprising an x-axis, the device may load the image from various locations via various means. For example, the image may be loaded from a memory, an internal storage device, an external storage device, or an online storage medium. The device may load the image via wire or wireless communication.

The image may be a 2D image having an x-axis and a y-axis. The image also could be a 3D image comprising more than two axes, for example, an x-axis, a y-axis and a z-axis. Additionally, the image may be a grayscale image. When the image is not a grayscale image, the device may convert the non-grayscale image into a grayscale image.

Figure 2:
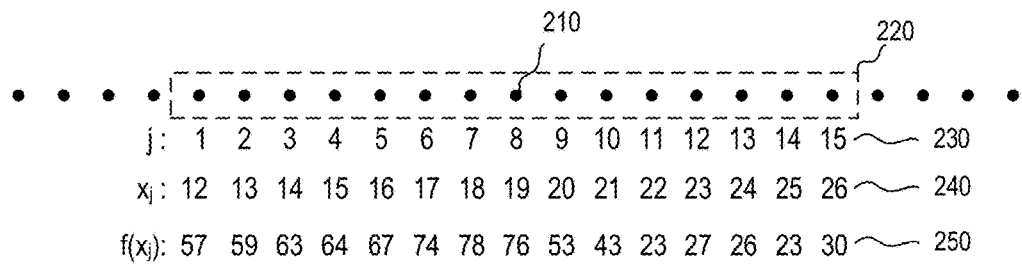
FIG. 2 shows an exemplary diagram of selecting a pixel set corresponding to a pixel of an image.

The device selects a pixel set along the x-axis consecutively and, if desired, symmetrically to each pixel of the image, and each pixel may be a target pixel. For example, as shown in FIG. 2, each pixel 210 is the target pixel. The device selects the pixel set having n number of consecutive pixels along the x-axis, wherein n is a mask length and could be any integer number larger than one. The size of the mask length may be correlated with the resolution of the edge detections, and a preferred range for the mask length may be from about 5 to about 20. In FIG. 2, as an example, the mask length n is taken as 15, and the pixel set 220 is consecutive along x-axis and symmetric to the target pixel 210. Therefore, there are seven pixels in the pixel set 220 at the left side of the target pixel 210 and seven pixels in the pixel set 220 at the right side of the target pixel 210.

Each pixel in the pixel set 220 has its position (j) 230 in the pixel set. For example, as FIG. 2 shows, j equals 1 for the most left pixel in the pixel set, j equals 2 for the second most left pixel, and so on. Each pixel in the pixel set 220 has its x-axis position value $(x_j)$ 240. For example, the most left pixel in the pixel set has an x-axis position value of 12, so that $x_1$ equals 12; the second most left pixel in the pixel set has an x-axis position value of 13, so that $x_2$ equals 13; and so on. Each pixel in the pixel set 220 has its intensity value $(f(x_j))$ 250. For example, the most left pixel in the pixel set has an intensity value of 57, so that $f(x_1)$ equals 57; the second most left pixel in the pixel set has an intensity value of 59, so that $f(x_2)$ equals 59; and so on.

Figure 3:
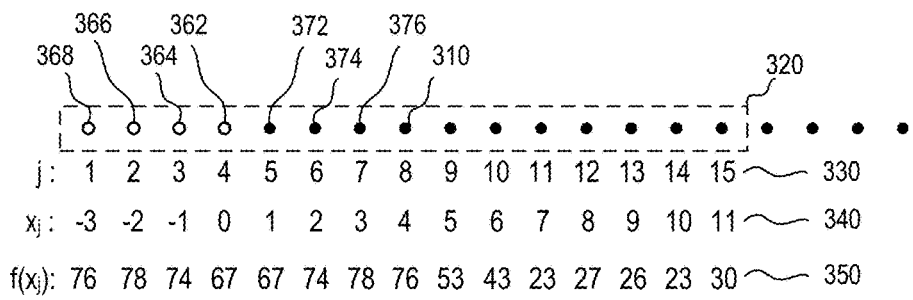
FIG. 3 shows an exemplary diagram of a selected pixel set when a pixel is near a starting side of the image.

When the target pixel is next or very near a starting side or an ending side of the image, there may be an insufficient number of pixels at either the left side or the right side of the target pixel. For example, as shown in FIG. 3, a target pixel 310 is near the starting side of the image, and there are four pixels at the left side of the target pixel 310. As the mask length is 15 and seven pixels at the left side of the target pixel 310 is need to construct the pixel set 320, there is an insufficient number of pixels at the left side the target pixel 310. Thus the device needs to fill four pixels, i.e., pixel 362, pixel 364, pixel 366, and pixel 368. In FIG. 3, the pixel set 320 has its position (j) 330, x-axis position value ($x_j$) 340, and intensity value ($f(x_j)$) 350.

In one exemplary embodiment, the side with an insufficient number of pixels can be filled with pixels with the same intensity values as the symmetric pixels relative to the edge of the image, respectively. Therefore, the intensity value of pixel 362 equals the intensity value of its symmetric pixel (i.e., pixel 372) at the right side relative to the edge of the image, so the intensity value $f(x_4)$ of pixel 362 equals 67. The x-axis position value of pixel 362 decreases by one compared with its neighboring pixel on the right side, so $x_4$ equals 0. In a similar way, the x-axis position value of pixel 364 decrease by one compared with its neighboring pixel 362 on the right side, so $x_3$ equals −1; and the intensity value of pixel 364 equals the intensity value of its symmetric pixel at the right side, i.e., pixel 374 (at j=6), so $f(x_3)$ equals 74. The x-axis position value of pixel 366 decrease by one compared with its neighboring pixel 364 on the right side, so $x_2$ equals −2; and the intensity value of pixel 366 equals the intensity value of its symmetric pixel at the right side, i.e., pixel 376 (at j=7), so $f(x_2)$ equals 78. The x-axis position value of pixel 368 decreases by one compared with its neighboring pixel 366 on the right side, so $x_1$ equals −3; and the intensity value of pixel 368 equals the intensity value of its symmetric pixel at the right side, i.e., pixel 310 (at j=8), so $f(x_1)$ equals 76.

In another embodiment, the side with an insufficient number of pixels can be filled with pixels with an equal intensity value as the intensity value of the pixel at the starting side or the ending side of the image. For example, the intensity values of pixels 362, 364, 366, and 368 may be taken as the intensity value of pixel 372 because pixel 372 is at the starting side of the image. Therefore, we may have $f(x_1)=f(x_2)=f(x_3)=f(x_4)=67$ because the intensity value of pixel 372 equals 67.

In 130, the device computes an interpolant function u(x) based on the intensity values of the pixel set. When the mask length is n, the pixel set has n number of pixels, the x-axis position values of the pixel set are $x_j$, j=1, 2, . . . , n, and the intensity values of the pixel set are $f(x_j)$, j=1, 2, . . . , n, the interpolant function u(x) satisfies:

$$u(x_j)=f(x_j), j=1, 2, \ldots, n. \quad \text{(Equation 1)}$$

The interpolant function u(x) may be a combination of a series of base functions, and the combination of the base functions may be a linear combination or non-linear combination. In one exemplary embodiment, the interpolant function u(x) may be computed as a linear combination of Lagrangian basis $L_j(x)$, j=1, 2, . . . , n as $$u = \sum_{j=1}^{n} f(x_j) L_j(x) \quad \text{(Equation 2)}$$

In 140, the device computes a fractional derivative $\mathcal{L}u(x)$ by applying a fractional differential operator $\mathcal{L}$ on the interpolant function. A fractional derivative $\mathcal{L}u(x)$ may be computed for every pixel of the image, so the fractional derivative $\mathcal{L}u(x)$ of the image is obtained. The fractional differential operator $\mathcal{L}$ may be any fractional differential operator with a fractional order α. In an exemplary embodiment, the fractional differential operator $\mathcal{L}$ may be a modified Riesz space fractional differential operator, which may be defined as a combination of two one-sided Riemann-Liouville fractional derivatives. The modified Riesz space fractional differential operator may take the form of $(\mathcal{L}f)(x)=-C_\alpha(_aD_x^\alpha f(x) - _xD_b^\alpha f(x))$, wherein $$_aD_x^\alpha f(x) = \frac{1}{\Gamma(m-\alpha)} \frac{d^m}{dx^m} \int_a^x (x-\tau)^{m-\alpha-1} f(\tau) d\tau \quad \text{(Equation 3)}$$

$$_xD_b^\alpha f(x) = \frac{(-1)^m}{\Gamma(m-\alpha)} \frac{d^m}{dx^m} \int_x^b (\tau-x)^{m-\alpha-1} f(\tau) d\tau$$

$$\Gamma(z) = \int_0^\infty e^{-t} t^{z-1} dt, \quad C_\alpha = \frac{1}{2 \cos(\pi\alpha/2)}$$

a is no larger than x, b is no smaller than x, and m is a largest integer smaller than the fractional order α.

In 150, the device detects local extremums of the fractional derivative $\mathcal{L}u(x)$. A local extremum may be a local minimum or local maximum. In an exemplary embodiment, a magnitude of the fractional derivative $\mathcal{L}u(x)$ may be computed based on a Euclidean norm, and local extremums are located by detecting peaks of the magnitude of the fractional derivative $\mathcal{L}u(x)$.

In 160, the device assigns the pixel having a local extremum as an edge of an object within the image. When more than one local extremum is detected, the device assigns the pixels corresponding to the more than one local extremum as edges of a single object or multiple objects within the image. The device may overlay a different color or different intensity on the assigned pixel to indicate the edge of the object.

Figure 4:
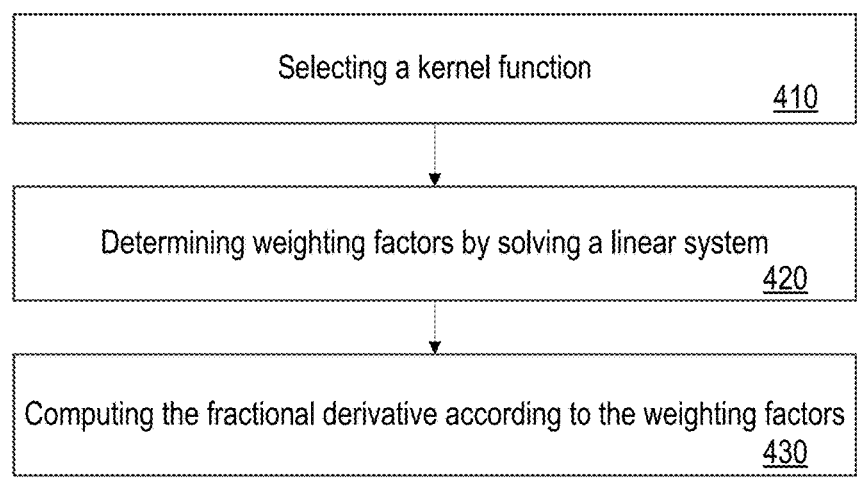
FIG. 4 shows a block diagram of computing a fractional derivative by applying a fractional differential operator on an interpolant function.

As shown in FIG. 4, when the device computes the fractional derivative $\mathcal{L}u(x)$ by applying a fractional differential operator $\mathcal{L}$ on the interpolant function u(x), the device selects a kernel function 410, determines weighting factors by solving a linear system 420, and computes the fractional derivative according to the weighting factors 430. The kernel function can be defined as φ(x, y), wherein x is a first argument and y is a second argument. The weighting factors can be defined as $\omega_j$, j=1, 2, . . . , n, and the fractional derivative $\mathcal{L}u(x)$ can be expressed in the form of $$\mathcal{L}u(x) = \sum_{j=1}^{n} \omega_j f(x_j). \quad \text{(Equation 4)}$$

In 410, the device selects a kernel function φ(x, y). A kernel approximation may be taken by approximating a function by a kernel function with a special form. In one exemplary embodiment, the kernel function may be a scaled Gaussian kernel function with a shape parameter c, and the scaled Gaussian kernel function has the form of $\varphi(x,y)=e^{-c^2|x-y|^2}$. The kernel function may be a simplified scaled Gaussian kernel function with the form of $\phi(x)=e^{-c^2x^2}$. The shape parameter c may be correlated with the accuracy of the edge detection and may be any real number larger than zero. The preferred value for the shape parameter c is between about 0.5 and about 1.2.

When the kernel function is a simplified scaled Gaussian kernel function with the form of $\phi(x)=e^{-c^2x^2}$, the kernel function may be expressed with a Taylor expansion of exponential function as $$\phi(x) = \sum_{n=0}^{\infty} \frac{(-1)^n c^{2n}}{n!} x^{2n}. \quad \text{(Equation 5)}$$

Additionally, the Riemann-Liouville fractional derivative of the power function can be given by $$_a\mathfrak{D}_x^\alpha x^n = n!(x-a)^{-\alpha} \sum_{k=0}^{n} \frac{a^{n-k}(x-a)^k}{(n-k)!\Gamma(k-\alpha+1)}. \quad \text{(Equation 6)}$$

By combining the Equations 5 and 6, we have the left side Riemann-Liouville fractional derivative of the simplified scaled Gaussian kernel function φ(x) as $$_a\mathfrak{D}_x^\alpha \phi(x) = \quad \text{(Equation 7)}$$
$$(x-a)^{-\alpha} \sum_{n=0}^{\infty} \frac{(-1)^n c^{2n}(2n)!}{n!} \left( \sum_{k=0}^{2n} \frac{a^{2n-k}(x-a)^k}{(2n-k)!\Gamma(k-\alpha+1)} \right)$$

and the right side Riemann-Liouville fractional derivative of the simplified scaled Gaussian kernel function φ(x) as $$_x\mathfrak{D}_x^\alpha \phi(x) = \quad \text{(Equation 8)}$$
$$(b-x)^{-\alpha} \sum_{n=0}^{\infty} \frac{(-1)^n c^{2n}(2n)!}{n!} \left( \sum_{k=0}^{2n} \frac{b^{2n-k}(x-b)^k}{(2n-k)!\Gamma(k-\alpha+1)} \right)$$

Eventually, when the fractional differential operator $\mathcal{L}$ is a modified Riesz space fractional differential operator defined as a combination of two one-sided Riemann-Liouville fractional derivatives, the modified Riesz space fractional differential of the scaled Gaussian kernel function of φ(x, y) can be calculated by combining Equations 7 and 8 as $$(\mathcal{L}\varphi)(x, y) = -C_\alpha(_a\mathfrak{D}_x^\alpha \varphi(x, y) - _x\mathfrak{D}_b^\alpha \varphi(x, y)) \quad \text{(Equation 9)}$$
$$= \begin{cases} ((_{a-y}\mathfrak{D}_{x-y}^\alpha - _{x-y}\mathfrak{D}_{b-y}^\alpha)\phi)(x-y), \text{ if } x-y \geq 0 \\ ((_{y-x}\mathfrak{D}_{y-a}^\alpha - _{y-b}\mathfrak{D}_{y-x}^\alpha)\phi)(y-x), \text{ if } x-y < 0 \end{cases}$$

In 420, the device determines the weighting factors $\omega_j$, j=1, 2, ..., n by solving a linear system. In one exemplary embodiment, the linear system have the form of $$K\omega = \mathcal{L}\Phi(x) \quad \text{(Equation 10)}$$

wherein $K_{ij} = \varphi(x_i, x_j)$ and $\mathcal{L}\Phi(x)_j = \mathcal{L}\varphi(x, x_j)$. The kernel function φ(x, y) may be the scaled Gaussian kernel function $\varphi(x, y) = e^{-c^2|x-y|^2}$, so that $K_{ij}$ may be calculated by the scaled Gaussian kernel function. The fractional differential operator $\mathcal{L}$ may act on the first argument of the kernel function, so that $\mathcal{L}\Phi(x)_j$ may be calculated by $\mathcal{L}\varphi(x, x_j)$ based on Equation 9. After $K_{ij}$ and $\mathcal{L}\Phi(x)_j$ are calculated, the linear system may be solved to determine the values of weighting factors $\omega_j$, j=1, 2, ..., n.

In 430, the device computes the fractional derivative $\mathcal{L}u(x)$ according to the weighting factors. In one exemplary embodiment, the fractional derivative $\mathcal{L}u(x)$ may be a linear combination of the weighting factors and the intensity values of the pixel set. For example, the fractional derivative $\mathcal{L}u(x)$ may be calculated by Equation 4.

FIGS. 5A-5F shows an exemplary embodiment of applying the disclosed method to detecting edges within an image.

Figure 5A:
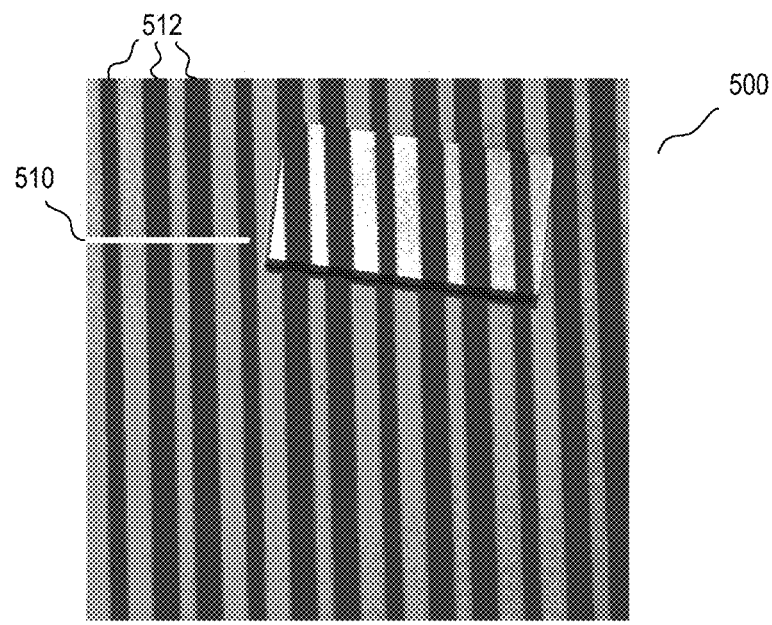
FIG. 5A shows an image in an exemplary embodiment.

FIG. 5A shows a grayscale image 500. The grayscale image 500 may be an image acquired by a camera taking images of 3D objects. The grayscale image 500 also may be an image loaded by the device from an internal or external storage. If the initially acquired or loaded image is a non-grayscale image, the grayscale image 500 may be an image after the non-grayscale image is converted to grayscale. The grayscale image 500 includes strips 512. In the following description, the white horizontal line 510 will be taken as an example to illustrate the disclosed method.

Figure 5B:
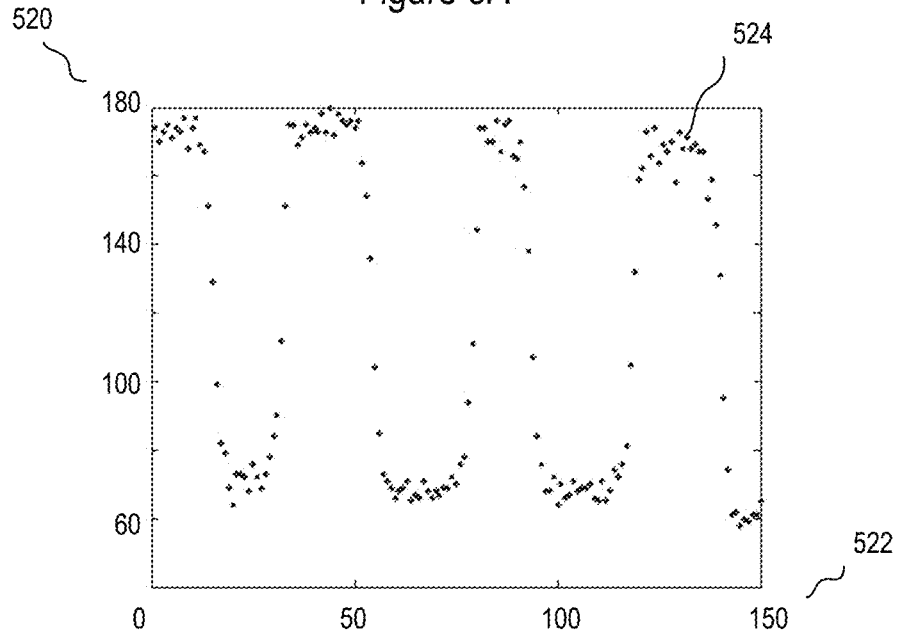
FIG. 5B shows intensity values of the pixels along the white horizontal line in FIG. 5A.

FIG. 5B shows the intensity value of the pixels along the white horizontal line 510 in FIG. 5A. The horizontal axis is the x-axis position value 522 of the pixels $x_j$. The vertical axis is the intensity value 520 of the pixels $f(x_j)$, which is the grayscale value of the pixels. The graph 524 shows the intensity value of the pixels as a function of their corresponding x-axis position value, so that $$f(x_j), j=1, 2, \ldots, N \quad \text{(Equation 11)}$$

In this exemplary embodiment, N equals 150, which means there are 150 pixels along the white horizontal line 510 in FIG. 5A.

Figure 5C:
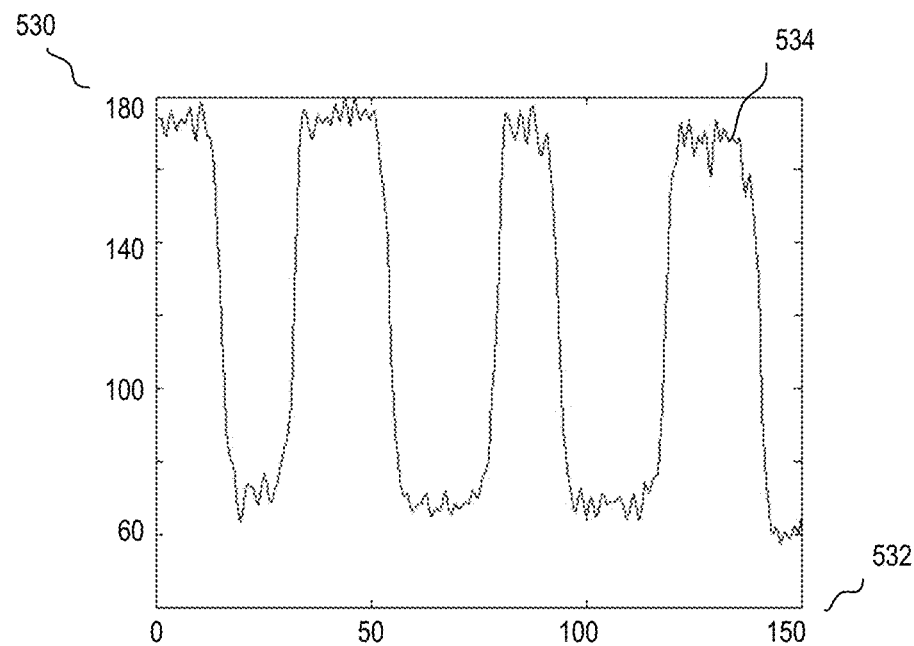
FIG. 5C shows the interpolant function for the pixels corresponding to the intensity values of the pixels in the exemplary embodiment.

FIG. 5C shows the interpolant function for the pixels. The horizontal axis is the x-axis position value 532 of the pixels. The vertical axis is the intensity value 530 of the pixels. The curve 534 shows the intensity value of the pixels as a function of their corresponding x-axis position value, so that the interpolant function u(x) may be computed as a linear combination of Lagrangian basis $L_j(x)$, j=1, 2, ..., n as $$u = \sum_{j=1}^{n} f(x_j) L_j(x) \quad \text{(Equation 12)}$$

In Equation 12, n is the mask length and is taken as 15 in this exemplary embodiment. The interpolant function in Equation 12 satisfies the relationship of Equation 1.

Figure 5D:
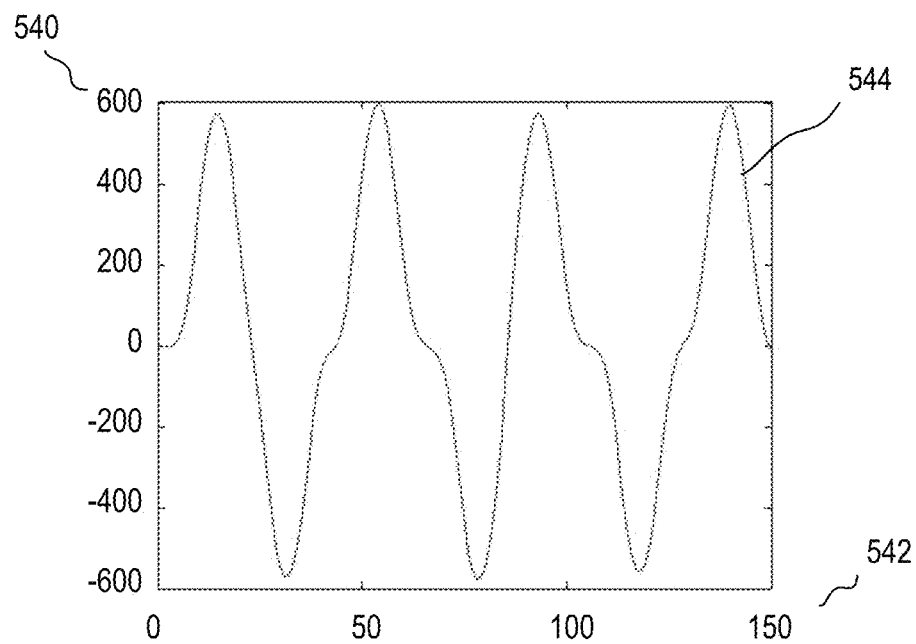
FIG. 5D shows the fractional derivative of the pixels in the exemplary embodiment.

FIG. 5D shows the fractional derivative of the pixels. The horizontal axis is the x-axis position value 542 of the pixels. The vertical axis is the fractional derivative 540 of the pixels. The curve 544 shows the fractional derivative of the pixels as a function of their corresponding x-axis position value. The fractional derivative is computed by applying the fractional differential operator to the interpolant function, so that $$\mathcal{L}u(x) = \sum_{j=1}^{n} f(x_j) \mathcal{L} L_j(x) = \sum_{j=1}^{n} \omega_j f(x_j) \quad \text{(Equation 13)}$$

In this exemplary embodiment, the fractional differential operator is taken as the modified Riesz space fractional differential operator, and the kernel function may be the scaled Gaussian kernel function. Therefore, the Equation 13 can be computed by determining the values of the weighting factors $\omega_j$, j=1, 2, ..., n with the combination of Equations 9 and 10. In this embodiment, the fractional order α is taken as 0.5, and the shape parameter c is taken as 1.

Figure 5E:
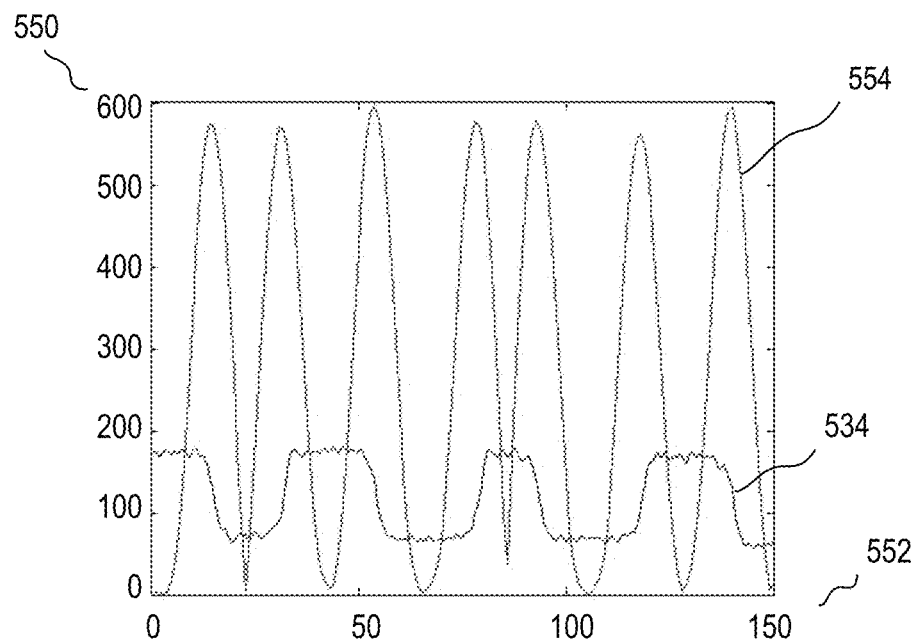
FIG. 5E shows the magnitude of the fractional derivative of the pixels in the exemplary embodiment.

FIG. 5E shows the magnitude of the fractional derivative of the pixels. The horizontal axis is the x-axis position value 552 of the pixels. The vertical axis is the magnitude of the fractional derivative 550 of the pixels. The curve 554 shows the magnitude of the fractional derivative of the pixels as a function of their corresponding x-axis position value. In comparison, the curve 534 of the intensity value of the pixels as a function of their corresponding x-axis position value is also showed in FIG. 5E. In this embodiment, the magnitude of the fractional derivative is computed by applying the Euclidean norm of the fractional derivative.

Figure 5F:
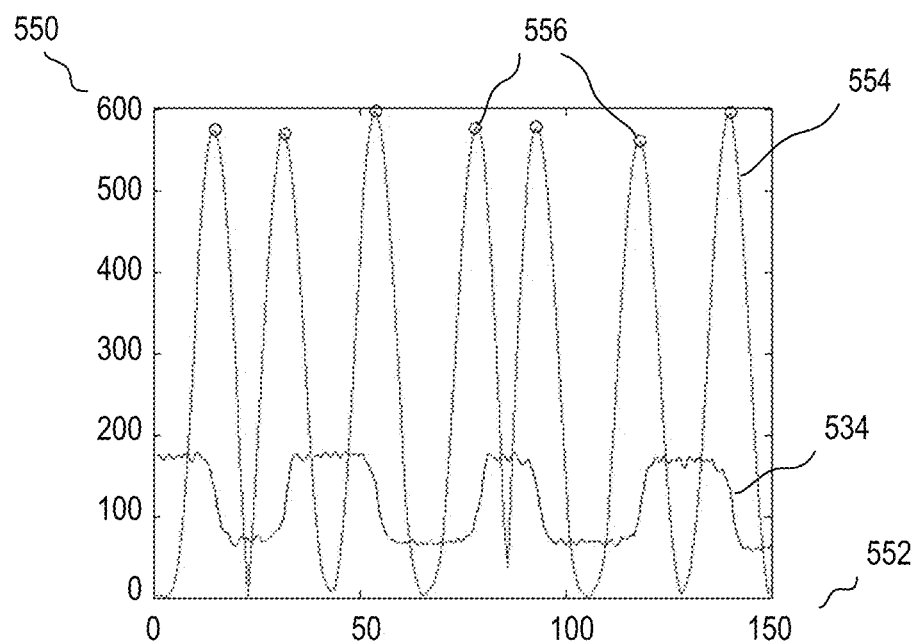
FIG. 5F shows the peaks detected by locating maximum locations of the magnitude of the fractional derivative of the pixels in the exemplary embodiment.

FIG. 5F shows the peaks detected by locating maximum locations. The horizontal axis is the x-axis position value 552 of the pixels. The vertical axis is the magnitude of the fractional derivative 550 of the pixels. The curve 554 shows the magnitude of the fractional derivative of the pixels as a function of their corresponding x-axis position value. In comparison, the curve 534 of the intensity value of the pixels as a function of their corresponding x-axis position value is also showed. In this embodiment, the local maximums 556 are located, corresponding to the edges within the image along the white line in FIG. 5A.

Figure 5G:
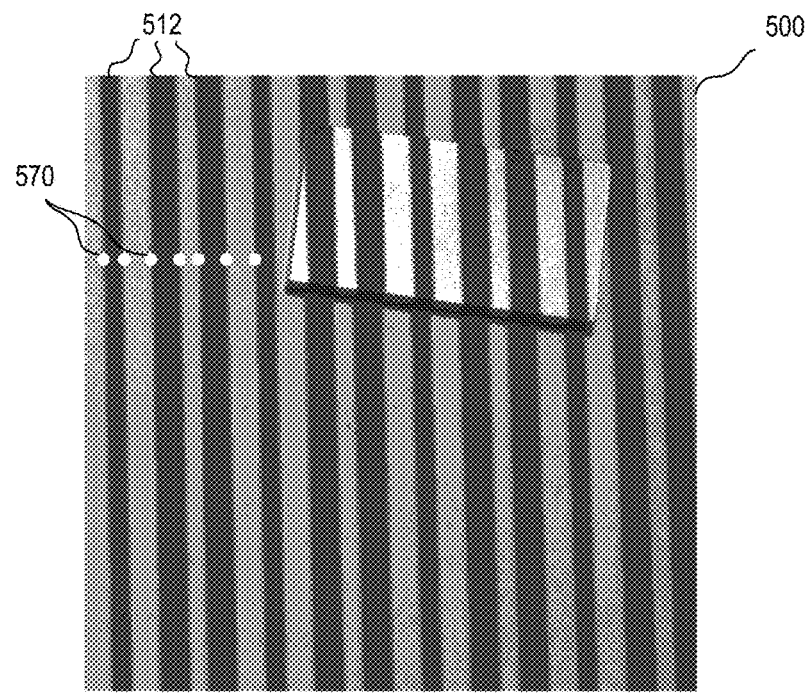
FIG. 5G shows the edge detection result along the white horizontal line in FIG. 5A.

FIG. 5G shows the edge detection result for the white line. The pixels 570 within the image correspond to the local maximums detected in FIG. 5F, illustrating the edges detected along the while line.

Figure 5H:
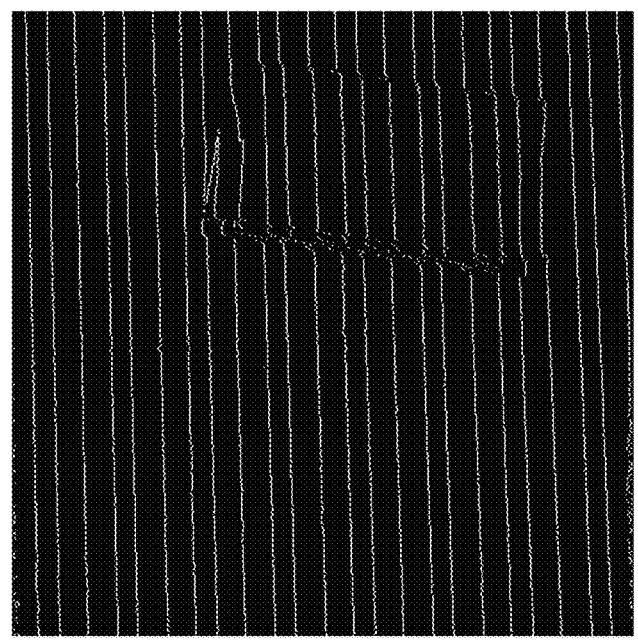
FIG. 5H shows the edge detection result for the whole image in the exemplary embodiment.

FIG. 5H shows the edge detection result for the whole image. When the disclosed method is applied to the whole image, the pixels 570 in FIG. 5G become lines, illustrating the edges detected within the image.

Parameters in the edge detection method, such as the fractional order α, the shape parameter c, and mask length n may be adjusted depending on the situation and application requirements. FIGS. 6A-6D show different edge detection results when different parameters with different values are used.

Figure 6A:
FIG. 6A shows an image in another exemplary embodiment.
Figure 6B:
FIG. 6B shows the edge detection result of the image when the fractional order equals 0.5, the shape parameter equals 1, and the mask length equals 15.
Figure 6C:
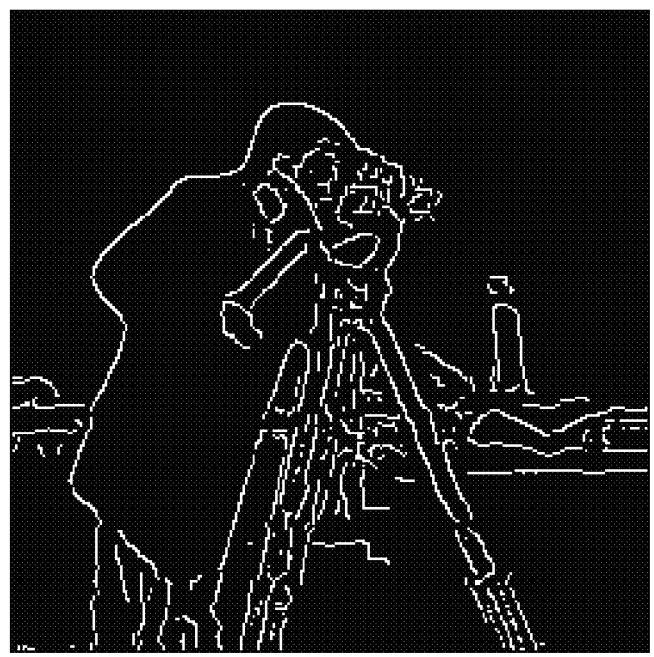
FIG. 6C shows the edge detection result of the image when the fractional order equals 0.5, the shape parameter equals 0.5, and the mask length equals 15.
Figure 6D:
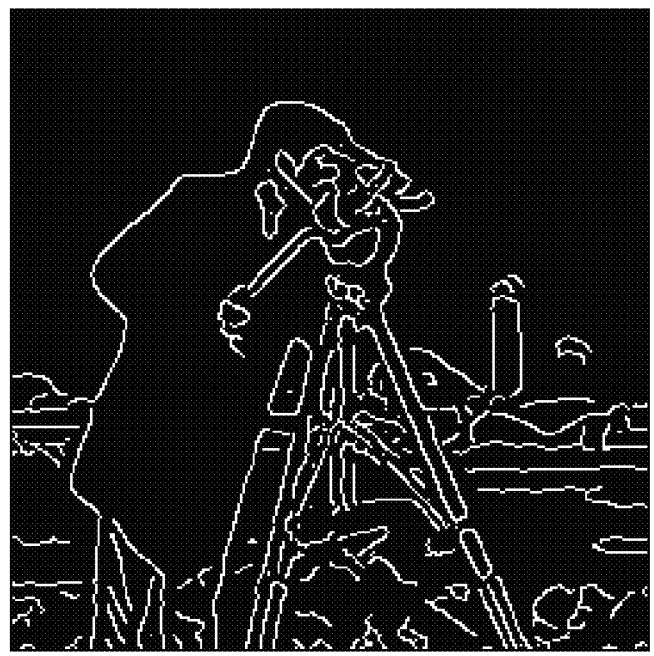
FIG. 6D shows the edge detection result of the grayscale image in FIG. 6A when the fractional order equals 1.2, the shape parameter equals 1, and the mask length equals 15.

FIG. 6A is a grayscale image, which will be subjected to the disclosed edge detection method with parameters with different values. FIG. 6B is the edge detection result when the fractional order α equals 0.5, the shape parameter c equals 1, and the mask length n equals 15. FIG. 6C is the edge detection result when the fractional order α equals 0.5, the shape parameter c equals 0.5, and the mask length n equals 15. FIG. 6D is the edge detection result when the fractional order α equals 1.2, the shape parameter c equals 1, and the mask length n equals 15.

Compared with previously used edge detection methods, the disclosed method improves the accuracy of edge detection, eliminates the need for applying additional fractional integration for noise suppression, and requires a smaller mask length to achieve a desired accuracy. The present disclosed method may be used in 3D scanning technology using a strip pattern. When performing edge detection of the same image by different prior art derivative approximation methods shown in FIG. 7A-7E, compared with edge detection results in FIG. 8B-8E, the difference and improvement resulting from the disclosed method is evident when viewing FIG. 8F.

FIG. 7A shows the Roberts operator. FIG. 7B shows the Prewitt operator. FIG. 7C shows the Sobel operator. FIG. 7D shows the Canny operator with a mask length of 16. FIG. 7E shows the fractional operator of the disclosed method with a mask length of 15, a fractional order of 0.5, and a shape parameter of 0.5.

Figure 8A:
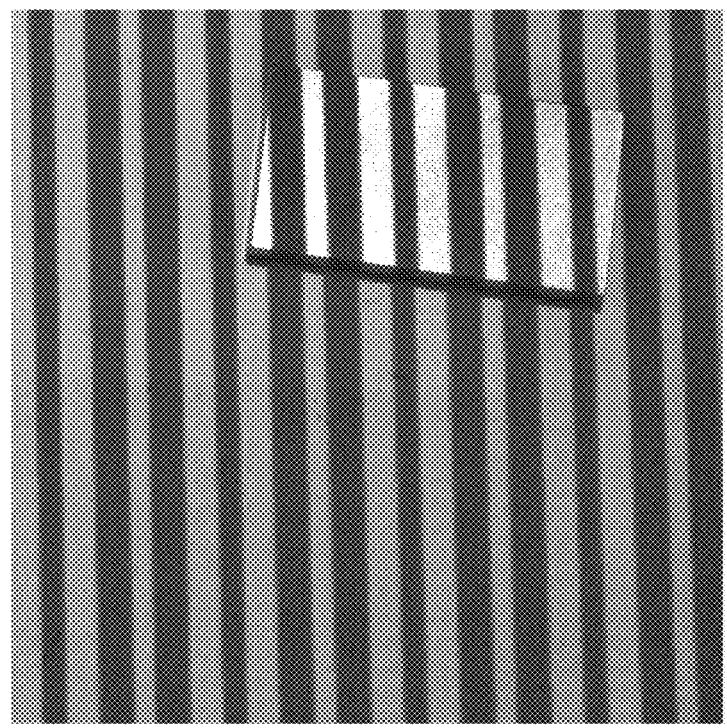
FIG. 8A shows an image, on which the edge detection with different derivative operators are applied.
Figure 8B:
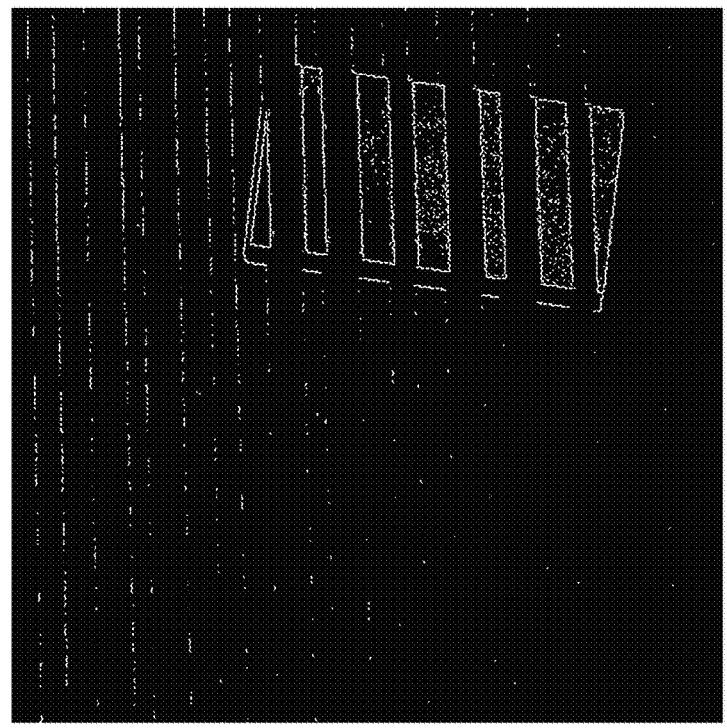
FIG. 8B shows the edge detection result of the image with applying Robert operator.
Figure 8C:
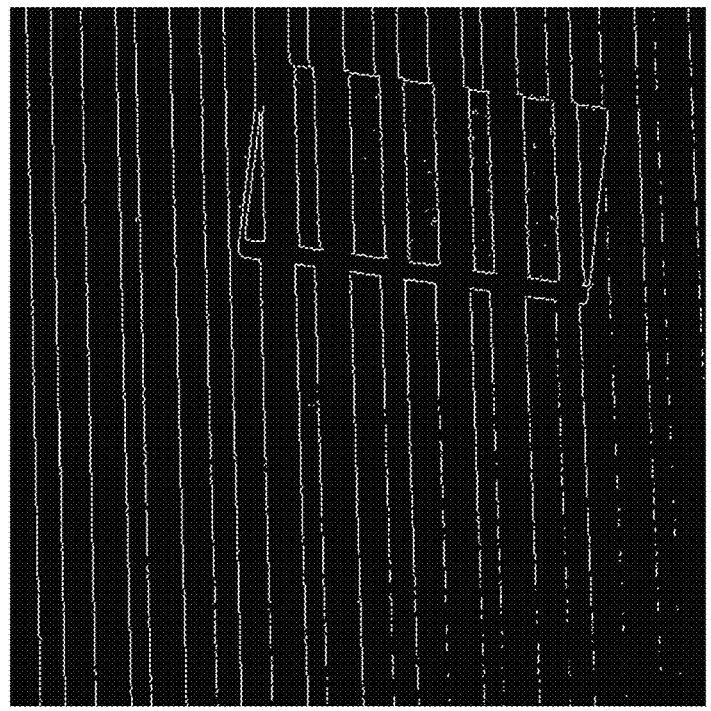
FIG. 8C is the edge detection result of the image with applying Prewitt operator.
Figure 8D:
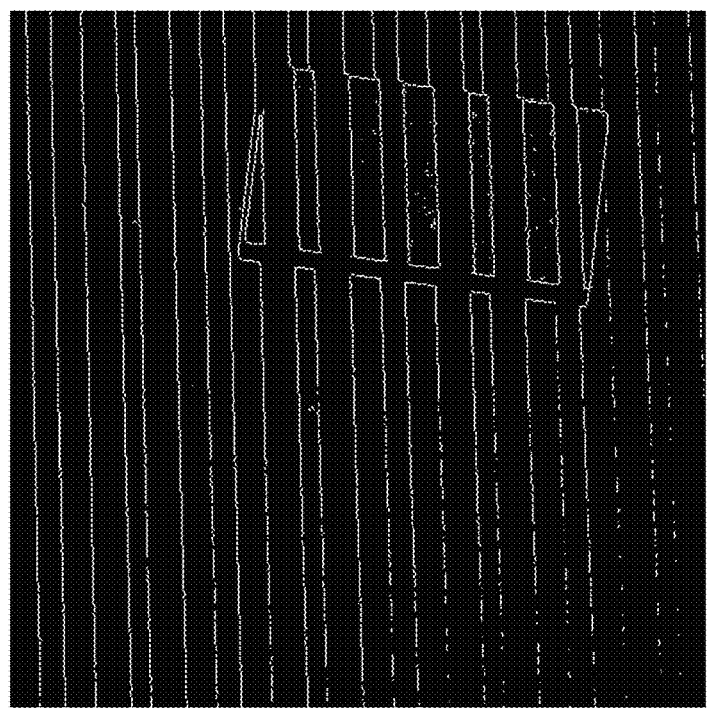
FIG. 8D is the edge detection result of the image with applying Sobel operator.
Figure 8E:
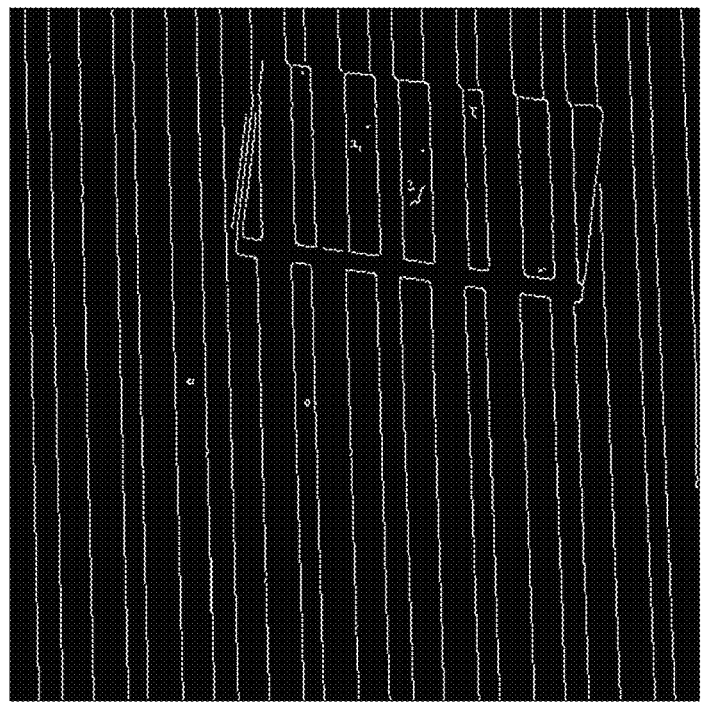
FIG. 8E is the edge detection result of the image with applying Canny operator with the mask length of 16.
Figure 8F:
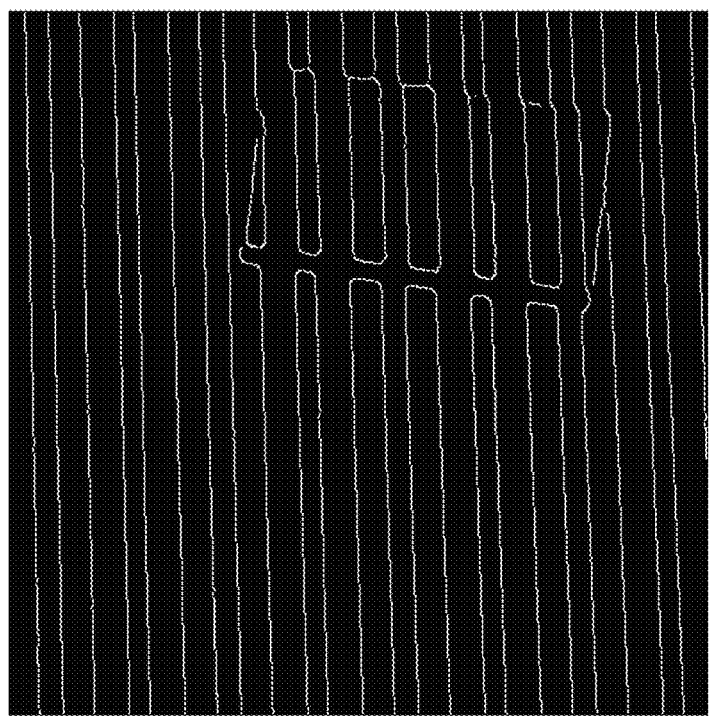
FIG. 8F is the edge detection result of the image with applying the fractional operator in the disclosure with the mask length of 15, the fractional order of 0.5, and the shape parameter of 1.

FIG. 8A shows a grayscale image, on which the edge detection results with different derivative operators are shown in FIGS. 8B-8F. FIG. 8B is the edge detection result of the whole image with the Robert operator, showing a high false rejection rate, a high false acceptance rate, and a high sensitivity to noise. FIG. 8C is the edge detection result of the whole image with the Prewitt operator, showing that some edges are missed and results are sensitive to noise. FIG. 8D is the edge detection result of the whole image with the Sobel operator, showing that some edges are missed and results are sensitive to noise. FIG. 8E is the edge detection result of the whole image with the Canny operator with a mask length of 16, showing some false acceptance due to noise. FIG. 8F is the edge detection result of the whole image with the fractional operator as used in the disclosed method with a mask length of 15, a fractional order of 0.5, and a shape parameter of 1, showing satisfactory performance and results.

Therefore, the method of the present disclosure can achieve high accuracy, for example spectral convergence. The method of the present disclosure can also involve a smoothing effect, so that it is not necessary to apply an additional fractional integration for noise suppression. Furthermore, the method of the present disclosure usually requires smaller mask length to obtain desired accuracy.

Figure 9:
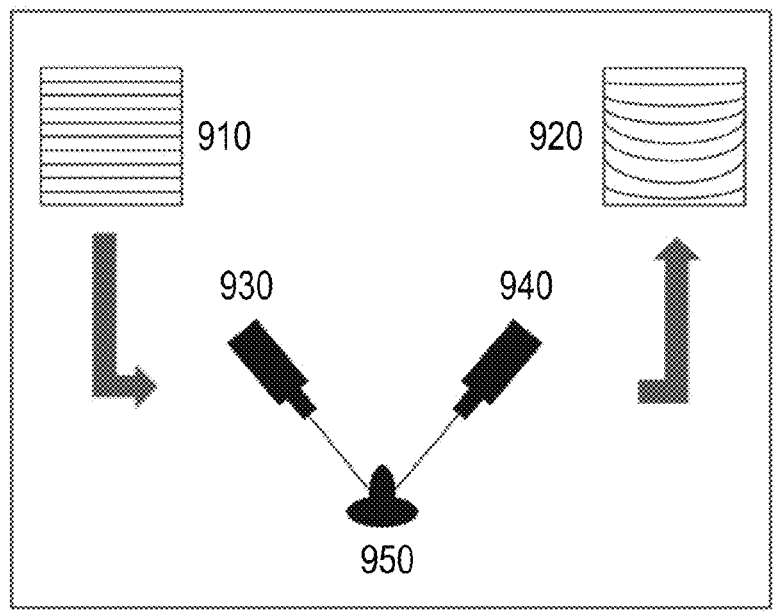
FIG. 9 shows a schematic implementation of a 3D scanning technology using a strip pattern.

In another embodiment, the method of the present disclosure may be used in 3D scanning technology using a strip pattern, as shown in FIG. 9. During 3D scanning, a light projecting device 930 projects the strip pattern 910 onto a 3D object 950, and an imaging capture device 940 acquires an image of the strip pattern on the 3D object. With edge detection of the strip pattern within the image, a deformed strip pattern is recovered, leading to reconstruction of the shape of the 3D object. The light projecting device 930 may be a projector. The imaging capture device 940 may be a camera, including, but not limited to, a black-white digital camera and a color digital camera.

Figure 10:
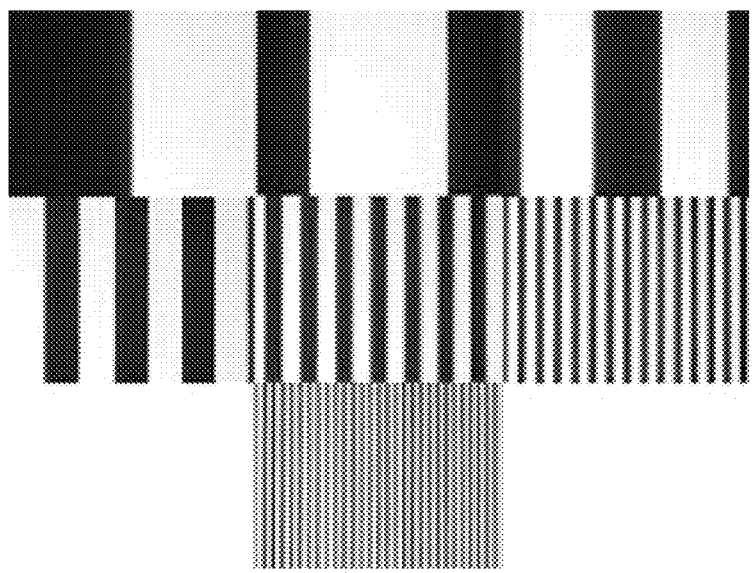
FIG. 10 shows an example of the strip pattern.

The strip pattern may be a grayscale strip pattern or a binary strip pattern. The binary strip pattern may include one or more white and black stripes. The strip pattern may be a pattern with evenly distributed stripes or a combination of strip patterns with unevenly distributed strips with different width or length. FIG. 10 shows an example of the strip pattern. The strip pattern includes a few sections. In each section, the width and numbers of white and black strips may differ.

Figure 11:
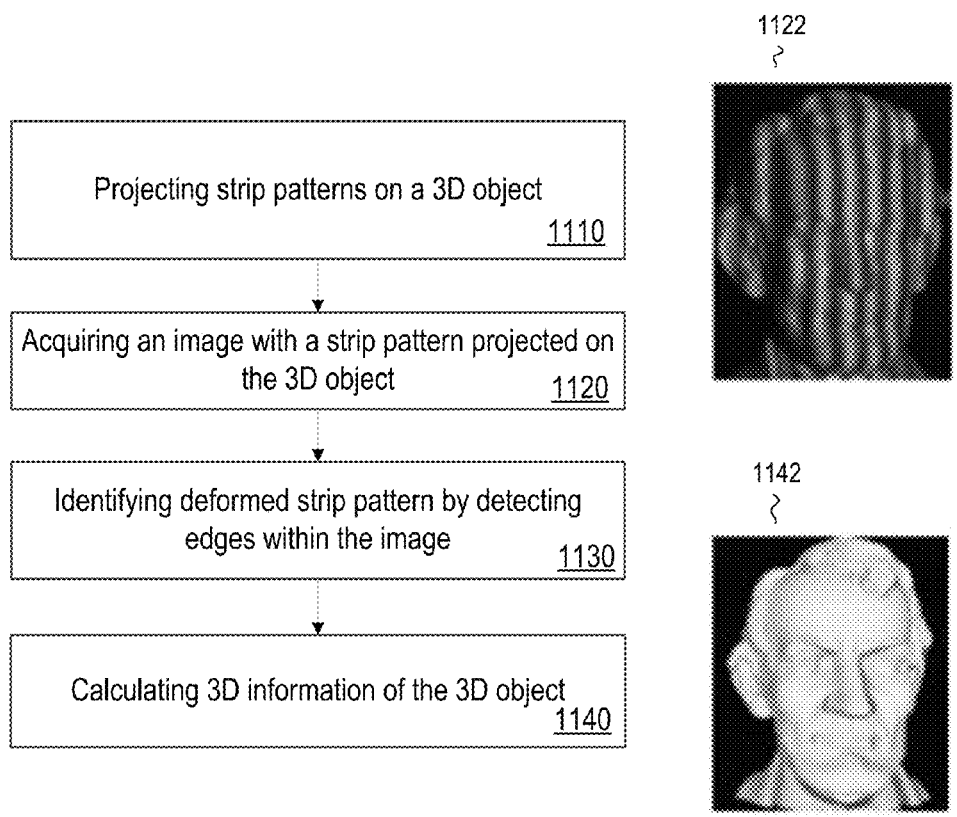
FIG. 11 shows a block diagram of a method of calculating 3D information based on 3D scanning and edge detection methods.

FIG. 11 shows a method of calculating 3D information based on a 3D scanning and edge detection method. The method includes projecting a strip pattern on a 3D object 1110, acquiring an image with the strip pattern projected on the 3D object 1120, identifying a deformed strip pattern by detecting edges within the image, and calculating 3D information of the 3D object.

The method of calculating 3D information based on the 3D scanning and edge detection method may be implemented on an electronic device. The electronic device may include a light projecting device, an imaging capture device, a memory, and a processor. The light projecting device projects the strip pattern onto the 3D object, and the imaging capture device acquires the image 1122 of the strip pattern projected on the 3D object. The process is configured to perform edge detection of the strip pattern within the image 1122 and calculate 3D information 1142 of the 3D object.

The method of calculating 3D information based on 3D scanning and the disclosed edge detection technology may reduce the pattern number and increase scanning speed. The method may also reduce errors and increase scanning accuracy. Furthermore, the method may increase resolution by sub-pixel accuracy.

While the particular invention has been described with reference to illustrative embodiments, this description is not meant to be limiting. Various modifications of the illustrative embodiments and additional embodiments of the invention, will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A method for detecting an edge of an object within an image, the method comprising:
   loading, by a device comprising a memory storing instructions and a processor in communication with the memory, an image comprising an x-axis;
   for each pixel of the image, selecting, by the device, a pixel set along the x-axis consecutively and symmetrically to each pixel, wherein:
      the pixel set has n number of pixels and n is a mask length,
      x-axis position values of the pixel set are $x_j$, $j=1, 2, \ldots, n$, and
      intensity values of the pixel set are $f(x_j)$, $j=1, 2, \ldots, n$;
   computing, by the device, an interpolant function $u(x)$ of each pixel of the image based on the intensity values of the pixel set, wherein $u(x_j)=f(x_j)$, $j=1, 2, \ldots, n$;
   computing, by the device, a fractional derivative $\mathcal{L}u(x)$ of each pixel of the image by applying a modified Riesz space fractional differential operator $\mathcal{L}$ with a fractional order $\alpha$ on the interpolant function;
   detecting, by the device, one or more local extremums of the fractional derivative; and
   assigning, by the device, one of the one or more local extremums as an edge of an object within the image.

2. The method according to claim 1, further comprising when the image is not a grayscale image, converting, by the device, the image to grayscale.

3. The method according to claim 1, wherein the modified Riesz space fractional differential operator $\mathcal{L}$ operates on a function $f(x)$ as $$(\mathcal{L}f)(x) = -C_\alpha({}_aD_x^\alpha f(x) - {}_xD_b^\alpha f(x)), \text{ wherein}$$

$${}_aD_x^\alpha f(x) = \frac{1}{\Gamma(m-\alpha)} \frac{d^m}{dx^m} \int_a^x (x-\tau)^{m-\alpha-1} f(\tau) d\tau$$

$${}_xD_b^\alpha f(x) = \frac{(-1)^m}{\Gamma(m-\alpha)} \frac{d^m}{dx^m} \int_x^b (\tau-x)^{m-\alpha-1} f(\tau) d\tau$$

$$\Gamma(z) = \int_0^\infty e^{-t} t^{z-1} dt, \quad C_\alpha = \frac{1}{2\cos(\pi\alpha/2)},$$

a is no larger than x,
b is no smaller than x, t is an integral variable, $\Gamma$ is a gamma function, z is a variable of the gamma function, $\tau$ is an integral variable, and
m is a largest integer smaller than the fractional order $\alpha$.

4. The method according to claim 1, wherein the computing, by the device, the fractional derivative $\mathcal{L}u(x)$ of each pixel of the image by applying the modified Riesz space fractional differential operator $\mathcal{L}$ on the interpolant function comprises:
   selecting, by the device, a kernel function $\varphi(x, y)$, wherein x is a first argument and y is a second argument;
   determining, by the device, weighting factors $\omega_j$, $j=1, 2, \ldots, n$ by solving a linear system $K\omega = \mathcal{L}\Phi(x)$, wherein K is a matrix and $\omega$ is an array, wherein $K_{ij}=\varphi(x_i,x_j)$ and $\mathcal{L}\Phi(x)_j = \mathcal{L}\varphi(x,x_j)$; and
   computing, by the device, the fractional derivative $\mathcal{L}u(x)$ of each pixel of the image based on $$\mathcal{L}u(x) = \sum_{j=1}^n \omega_j f(x_j).$$

5. The method according to claim 4, further comprising the kernel function $\varphi(x, y)$, by the device, as a scaled Gaussian kernel function $\varphi(x, y) = e^{-c^2|x-y|^2}$ or a simplified scaled Gaussian kernel function $\phi(x) = e^{-c^2 x^2}$ with a shape parameter c.

6. The method according to claim 5, wherein the shape parameter c varies between 0.5 and 1.2.

7. The method according to claim 5, wherein the modified Riesz space fractional differential operator operates on the kernel function as $$(\mathcal{L}\varphi)(x, y) = -C_\alpha({}_a\mathfrak{D}_x^\alpha \varphi(x, y) - {}_x\mathfrak{D}_b^\alpha \varphi(x, y)),$$

$$= \begin{cases} (({}_{a-y}\mathfrak{D}_{x-y}^\alpha - {}_{x-y}\mathfrak{D}_{b-y}^\alpha)\phi)(x-y), & \text{if } x-y \geq 0 \\ (({}_{y-x}\mathfrak{D}_{y-a}^\alpha - {}_{y-b}\mathfrak{D}_{y-x}^\alpha)\phi)(y-x), & \text{if } x-y < 0 \end{cases}$$

wherein:

$${}_a\mathfrak{D}_x^\alpha \phi(x) = (x-a)^{-\alpha} \sum_{n=0}^\infty \frac{(-1)^n c^{2n}(2n)!}{n!} \left( \sum_{k=0}^{2n} \frac{a^{2n-k}(x-a)^k}{(2n-k)!\Gamma(k-\alpha+1)} \right),$$

$${}_x\mathfrak{D}_b^\alpha \phi(x) = (b-x)^{-\alpha} \sum_{n=0}^\infty \frac{(-1)^n c^{2n}(2n)!}{n!} \left( \sum_{k=0}^{2n} \frac{b^{2n-k}(x-b)^k}{(2n-k)!\Gamma(k-\alpha+1)} \right),$$

$\varphi$ is a function, $\phi$ is a function, $\Gamma$ is a gamma function, $\alpha$ is a variable, n is a summation variable, k is a summation variable, and b is a variable.

8. The method according to claim 1, wherein the detecting, by the device, the one or more local extremums of the fractional derivative comprises:
   calculating, by the device, a magnitude of the fractional derivative by applying a Euclidean norm onto the fractional derivative; and
   detecting, by the device, one or more local maximums of the magnitude of the fractional derivative.

9. The method according to claim 1, wherein the fractional order a varies between 0.5 and 1.5.

10. The method according to claim 1, wherein the mask length n varies between 5 and 20.

11. A method for detecting an edge of an object within an image, the method comprising:
    loading, by a device comprising a memory storing instructions and a processor in communication with the memory, an image comprising an x-axis;
    for each pixel of the image, selecting, by the device, a pixel set along the x-axis consecutively and symmetrically to each pixel, wherein:
       the pixel set has n number of pixels, wherein n is a mask length,
       x-axis position values of the pixel set are $x_j$, $j=1, 2, \ldots, n$, and
       intensity values of the pixel set are $f(x_j)$, $j=1, 2, \ldots, n$;
    computing, by the device, an interpolant function $u(x)$ of each pixel of the image based on the intensity values of the pixel set, wherein $u(x_j)=f(x_j)$, $j=1, 2, \ldots, n$;
    wherein a kernel function $\varphi(x, y)$ comprises a scaled Gaussian kernel function $\varphi(x, y) = e^{-c^2|x-y|^2}$ with a shape parameter c, wherein x is a first argument and y is a second argument;
    computing, by the device, a fractional derivative $\mathcal{L}u(x)$ of each pixel of the image by applying a fractional differential operator $\mathcal{L}$ with a fractional order $\alpha$ on the interpolant function;

detecting, by the device, one or more local extremums of the fractional derivative; and assigning, by the device, one of the one or more local extremums as an edge of an object within the image.

12. The method according to claim 11, further comprising when the image is not a grayscale image, converting, by the device, the image to grayscale.

13. The method according to claim 11, wherein:

the fractional differential operator is a modified Riesz space fractional differential operator $\mathfrak{L}$; and the modified Riesz space fractional differential operator $\mathfrak{L}$ operates on a function $f(x)$ as $$(\mathfrak{L} f)(x) = -C_\alpha({}_aD_x^\alpha f(x) - {}_xD_b^\alpha f(x)), \text{ wherein}$$

$$_aD_x^\alpha f(x) = \frac{1}{\Gamma(m-\alpha)} \frac{d^m}{dx^m} \int_a^x (x-\tau)^{m-\alpha-1} f(\tau) d\tau$$

$$_xD_b^\alpha f(x) = \frac{(-1)^m}{\Gamma(m-\alpha)} \frac{d^m}{dx^m} \int_x^b (\tau-x)^{m-\alpha-1} f(\tau) d\tau$$

$$\Gamma(z) = \int_0^\infty e^{-t} t^{z-1} dt, \; C_\alpha = \frac{1}{2\cos(\pi\alpha/2)},$$

a is no larger than x, b is no smaller than x, t is an integral variable, $\Gamma$ is a gamma function, z is a variable of the gamma function, $\tau$ is an integral variable, and m is a largest integer smaller than the fractional order $\alpha$.

14. The method according to claim 13, wherein the computing, by the device, the fractional derivative $\mathfrak{L}u(x)$ of each pixel of the image by applying the fractional differential operator $\mathfrak{L}$ with the fractional order $\alpha$ on the interpolant function comprises:

determining, by the device, weighting factors $\omega_j$, $j=1, 2, \ldots, n$ by solving a linear system $K\omega = \mathfrak{L}\Phi(x)$, wherein K is a matrix and $\omega$ is an array, wherein $K_{ij} = \varphi(x_i, x_j)$ and $\mathfrak{L}\Phi(x)_j = \mathfrak{L}\varphi(x, x_j)$; and computing, by the device, the fractional derivative $\mathfrak{L}u(x)$ of each pixel of the image based on $$\mathfrak{L}u(x) = \sum_{j=1}^n \omega_j f(x_j).$$

15. The method according to claim 14, wherein the kernel function $\varphi(x, y)$ comprises a simplified scaled Gaussian kernel function $\phi(x) = e^{-c^2 x^2}$.

16. The method according to claim 15, wherein the modified Riesz space fractional differential operator operates on the kernel function as $$(\mathfrak{L}\varphi)(x, y) = -C_\alpha({}_a\mathfrak{D}_x^\alpha \varphi(x,y) - {}_x\mathfrak{D}_b^\alpha \varphi(x,y))$$

$$= \begin{cases} (({}_{a-y}\mathfrak{D}_{x-y}^\alpha - {}_{x-y}\mathfrak{D}_{b-y}^\alpha)\phi)(x-y), & \text{if } x-y \geq 0 \\ (({}_{y-x}\mathfrak{D}_{y-a}^\alpha - {}_{y-b}\mathfrak{D}_{y-x}^\alpha)\phi)(y-x), & \text{if } x-y < 0 \end{cases}$$

wherein:

$$_a\mathfrak{D}_x^\alpha \phi(x) = (x-a)^{-\alpha} \sum_{n=0}^\infty \frac{(-1)^n c^{2n}(2n)!}{n!} \left( \sum_{k=0}^{2n} \frac{a^{2n-k}(x-a)^k}{(2n-k)!\Gamma(k-\alpha+1)} \right),$$

$$_x\mathfrak{D}_b^\alpha \phi(x) = (b-x)^{-\alpha} \sum_{n=0}^\infty \frac{(-1)^n c^{2n}(2n)!}{n!} \left( \sum_{k=0}^{2n} \frac{b^{2n-k}(x-b)^k}{(2n-k)!\Gamma(k-\alpha+1)} \right),$$

$\varphi$ is a function, $\phi$ is a function, $\Gamma$ is a gamma function, $\alpha$ is a variable, n is a summation variable, k is a summation variable, and b is a variable.

17. The method according to claim 11, wherein the detecting, by the device, the one or more local extremums of the fractional derivative comprises:

calculating, by the device, a magnitude of the fractional derivative by applying a Euclidean norm onto the fractional derivative; and detecting, by the device, one or more local maximums of the magnitude of the fractional derivative.

18. The method according to claim 11, wherein the fractional order $\alpha$ varies between about 0.5 and 1.5.

19. The method according to claim 11, wherein the mask length n varies between 0.5 and 20.

20. The method according to claim 11, wherein the shape parameter c varies between 0.5 and 1.2.

21. A method of calculating 3D information of a 3D object, the method comprising:

projecting, by a device comprising a memory storing instructions and a processor in communication with the memory, a strip pattern on a 3D object;

acquiring, by the device, an image with the strip pattern projected on the 3D object;

detecting, by the device, edges of the strip pattern within the image, wherein the detecting the edges of the strip pattern within the image comprises:

for each pixel of the image, selecting, by the device, a pixel set along an x-axis of the image consecutively and symmetrically to each pixel, wherein the pixel set has n number of pixels and n is a mask length, x-axis position values of the pixel set are $x_j$, $j=1, 2, \ldots, n$, and intensity values of the pixel set are $f(x_j)$, $j=1, 2, \ldots, n$, computing, by the device, an interpolant function $u(x)$ of each pixel of the image based on the intensity values of the pixel set, wherein $u(x_j)=f(x_j)$, $j=1, 2, \ldots, n$, computing, by the device, a fractional derivative $\mathfrak{L}u(x)$ of each pixel of the image by applying a modified Riesz space fractional differential operator $\mathfrak{L}$ with a fractional order $\alpha$ on the interpolant function, detecting, by the device, one or more local extremums of the fractional derivative, and assigning, by the device, the one or more local extremums as the edges of the strip pattern within the image; and calculating, by the device, 3D information of the 3D object.

22. The method according to claim 21, wherein, the modified Riesz space fractional differential operator $\mathfrak{L}$ operates on a function $f(x)$ as $$(\mathfrak{L} f)(x) = -C_\alpha({}_aD_x^\alpha f(x) - {}_xD_b^\alpha f(x)), \text{ wherein}$$

$$_aD_x^\alpha f(x) = \frac{1}{\Gamma(m-\alpha)} \frac{d^m}{dx^m} \int_a^x (x-\tau)^{m-\alpha-1} f(\tau) d\tau$$

$$_xD_b^\alpha f(x) = \frac{(-1)^m}{\Gamma(m-\alpha)} \frac{d^m}{dx^m} \int_x^b (\tau-x)^{m-\alpha-1} f(\tau) d\tau$$

$$\Gamma(z) = \int_0^\infty e^{-t} t^{z-1} dt, \; C_\alpha = \frac{1}{2\cos(\pi\alpha/2)},$$

a is no larger than x, b is no smaller than x, t is an integral variable, $\Gamma$ is a gamma function, z is a variable of the gamma function, $\tau$ is an integral variable, and m is a largest integer smaller than the fractional order $\alpha$.

23. The method according to claim 21, wherein the computing, by the device, the fractional derivative $\mathfrak{L}u(x)$ of each pixel of the image by applying the modified Riesz space fractional differential operator $\mathfrak{L}$ on the interpolant function comprises:

selecting, by the device, a kernel function $\varphi(x, y)$, wherein x is a first argument and y is a second argument;

determining, by the device, weighting factors $\omega_j$, $j=1, 2, \ldots, n$ by solving a linear system $K\omega = \mathfrak{L}\Phi(x)$, wherein K is a matrix and $\omega$ is an array, wherein $K_{ij} = \varphi(x_i, x_j)$ and $\mathfrak{L}\Phi(x)_j = \mathfrak{L}\varphi(x, x_j)$; and computing, by the device, the fractional derivative $\mathfrak{L}u(x)$ of each pixel of the image based on $$\mathfrak{L}u(x) = \sum_{j=1}^{n} \omega_j f(x_j).$$

24. The method according to claim 23, further comprising the kernel function $\varphi(x, y)$, by the device, as a scaled Gaussian kernel function $\varphi(x, y) = e^{-c^2|x-y|^2}$ or a simplified scaled Gaussian kernel function $\phi(x) = e^{-c^2 x^2}$ with a shape parameter c.

25. The method according to claim 24, wherein the modified Riesz space fractional differential operator operates on the kernel function as $$(\mathfrak{L}\varphi)(x, y) = -C_\alpha({}_a\mathfrak{D}_x^\alpha \varphi(x, y) - {}_x\mathfrak{D}_b^\alpha \varphi(x, y))$$

$$= \begin{cases} (({}_{a-y}\mathfrak{D}_{x-y}^\alpha - {}_{x-y}\mathfrak{D}_{b-y}^\alpha)\phi)(x-y), & \text{if } x - y \geq 0 \\ (({}_{y-x}\mathfrak{D}_{y-a}^\alpha - {}_{y-b}\mathfrak{D}_{y-x}^\alpha)\phi)(y-x), & \text{if } x - y < 0 \end{cases}$$

wherein:

$${}_a\mathfrak{D}_x^\alpha \phi(x) = (x-a)^{-\alpha} \sum_{n=0}^{\infty} \frac{(-1)^n c^{2n}(2n)!}{n!} \left( \sum_{k=0}^{2n} \frac{a^{2n-k}(x-a)^k}{(2n-k)!\Gamma(k-\alpha+1)} \right),$$

$${}_x\mathfrak{D}_b^\alpha \phi(x) = (b-x)^{-\alpha} \sum_{n=0}^{\infty} \frac{(-1)^n c^{2n}(2n)!}{n!} \left( \sum_{k=0}^{2n} \frac{b^{2n-k}(x-b)^k}{(2n-k)!\Gamma(k-\alpha+1)} \right),$$

$\varphi$ is a function, $\phi$ is a function, $\Gamma$ is a gamma function, $\alpha$ is a variable, n is a summation variable, k is a summation variable, and b is a variable.

* * * * *